June 2, 1953     G. R. NELSON     2,640,364
VARIABLE SPEED MAGNETIC FLUID CLUTCH DRIVE
Filed Sept. 4, 1951     3 Sheets-Sheet 1
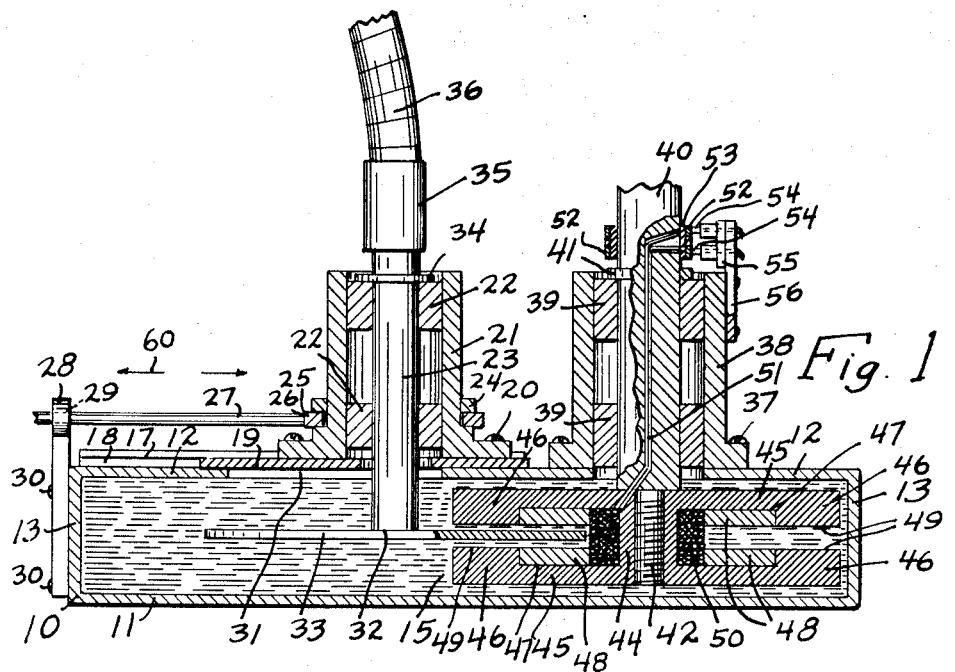
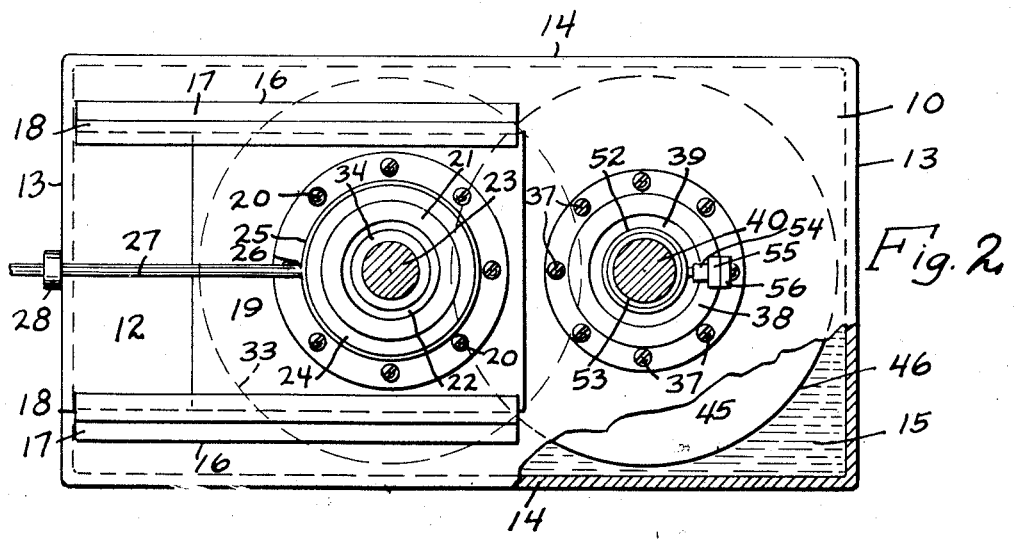
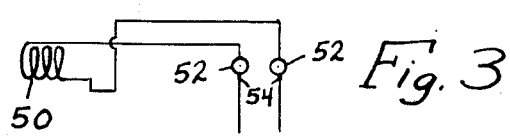
INVENTOR.
Gorman R. Nelson
BY Samg Slotsky
ATTORNEY INVENTOR.
Gorman R. Nelson
BY
Sam J. Slotsky
ATTORNEY Patented June 2, 1953

2,640,364

UNITED STATES PATENT OFFICE 2,640,364

VARIABLE SPEED MAGNETIC FLUID CLUTCH DRIVE

Gorman R. Nelson, Sioux Falls, S. Dak., assignor to Electronic Engineering Company of Sioux Falls, a division of The Iseman Corporation, Sioux Falls, S. Dak., a corporation of South Dakota Application September 4, 1951, Serial No. 244,955

7 Claims. (Cl. 74—199)

My invention relates to a variable speed clutch and drive.

An object of my invention is to provide a drive which incorporates the characteristics of both a clutch and a drive, and which drive can be controlled readily externally.

A further object of my invention is to provide a clutch and drive which functions without requiring the use of engaged solid surfaces, and instead utilizes the so-called magnetic fluid, or that type of fluid in which is thoroughly mixed finely disposed magnetic particles, such as iron particles and the like.

A further object of my invention is to provide a drive which includes variable speed features, such features arising from the fact that two co-planar discs are operated at different radii.

A further and important object of my invention is to provide such a driving arrangement in which the device itself requires relatively few parts, and thereby wherein frictional losses are reduced to a minimum.

A further object of my invention is to provide in a modified form, an arrangement having all of the above mentioned characteristics, in which arrangement, however, the magnetic forces are controlled and applied at certain portions of one of the co-planar discs at the instant when such forces provide their most efficient operation, and wherein the heat losses are considerably reduced thereby.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a sectional view of my device taken substantially along the longitudinal center thereof, except with certain portions being taken in fragmentary section, Figure 2 is a plan view of Figure 1 and showing a fragmentary section, Figure 3 is a diagram of the electrical circuit of the device shown in Figures 1 and 2.

Figure 6:
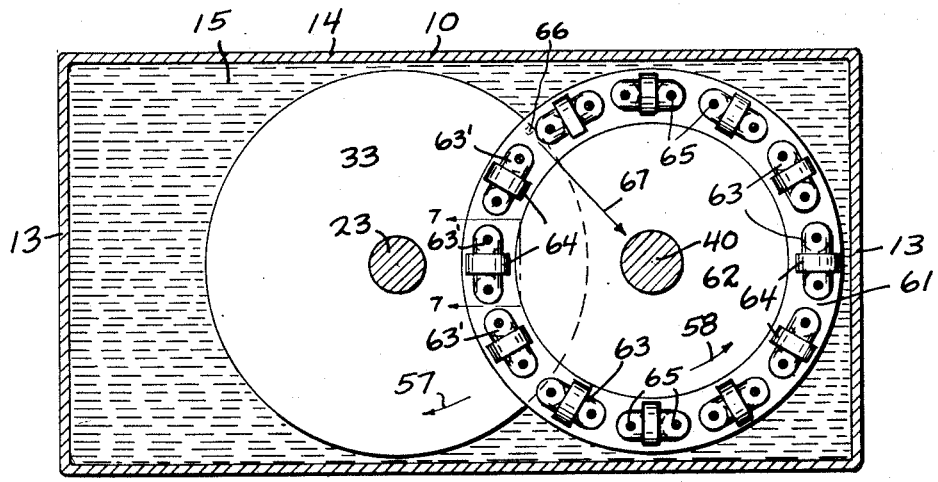
Figure 7:
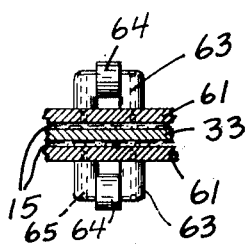
Figure 8:
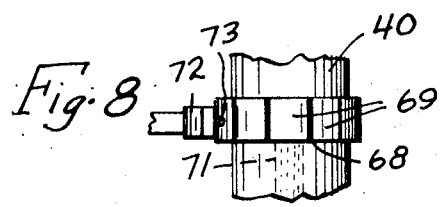
Figure 9:
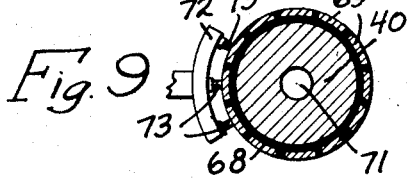
Figure 10:
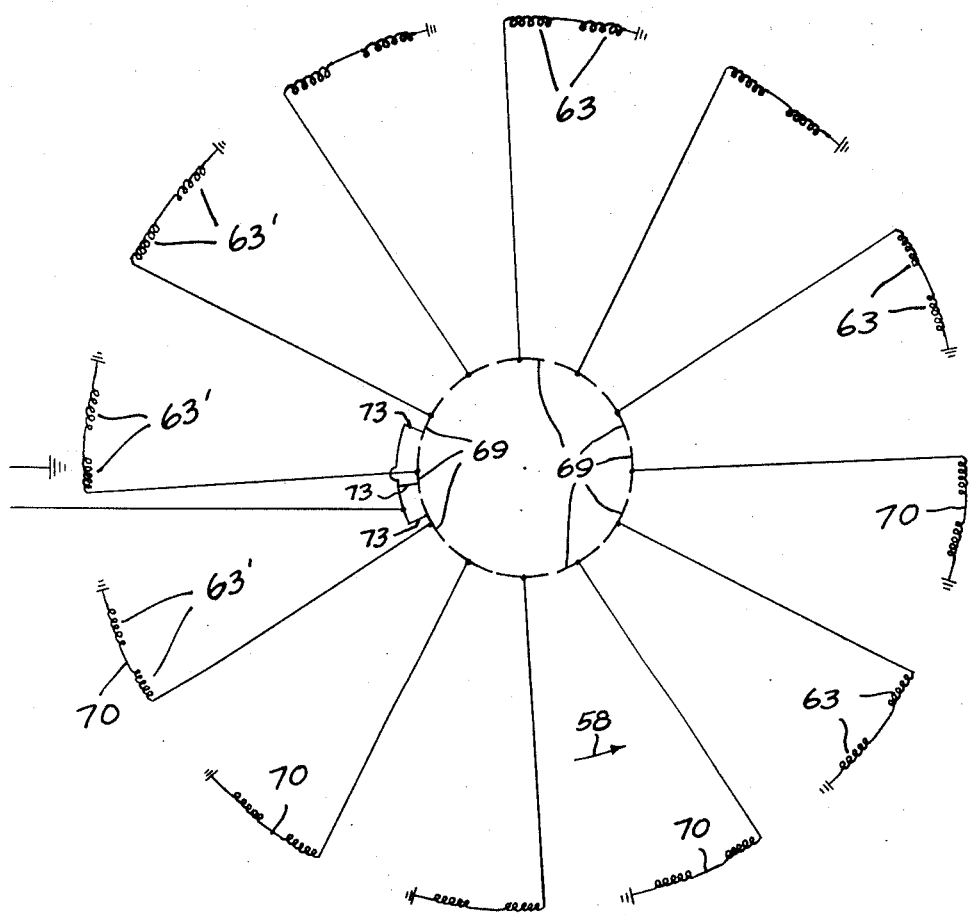

Figure 6 is a modified form of the device showing the structure of the same as it would appear with a section being taken immediately beneath the top wall of the casing, Figure 7 is a sectional detail taken along the lines 7—7 of Figure 6, Figure 8 is a detail of the commutator, Figure 9 is a plan view of Figure 8, and Figure 10 is a diagram of the electrical circuit of the modification shown in Figure 6.

My invention contemplates the provision of an efficiently operating variable speed magnetic fluid clutch drive in which the application of power can be transmitted from a driving shaft to a driven shaft, and wherein such arrangement can be controlled to provide a variable speed and torque, and wherein this arrangement can also be provided for a multiplicity of purposes requiring a smooth application of power, it being understood also that the drive of my invention can be made in any size to accommodate the intended purpose of the same.

I have used the character 10 to designate generally a rectangular casing having a bottom wall 11, a top wall 12, end walls 13, and side walls 14, this casing being made of a non-permeable or a non-magnetic material, and contained within the casing 10 I provide a magnetic fluid 15, this fluid consisting preferably of oil, in which oil is suspended finely divided iron particles, such iron particles thereby providing a highly magnetic force when magnetized.

Attached to the top wall 12 at 16 are a pair of guide members 17 having the channel portions 18, such channel portions 18 being adapted to receive the side edges of the plate 19, such plate also being made of non-magnetic material, and attached to the plate 19 at 20 is a vertically positioned cylindrical boss 21 having the bearings 22 in which bearings is journalled the shaft 23, the boss and the shaft being made of non-magnetic material, and securely attached to the boss 21 is the annular member 24. Also receiving the boss 21 is the ring 25 which is attached at 26 to a control rod 27 which passes through the member 28 at 29, the member 28 being attached at 30 to the casing 10. A lengthened slot 31 is provided in the top wall 12, and securely attached at 32 to the shaft 23 is a magnetic iron disc 33.

A collar or washer 34 is attached to the shaft 23 to support the disc 33 in fixed position, and attached at 35 to the shaft 23 is a flexible cable 36, the cable 36 passing to a motor or engine, the shaft 23 thereby providing the driving shaft of the arrangement, it being understood that a universal joint or any other type of connection could be attached to the shaft 23 as long as it permits longitudinal movement of the boss 21 as will be explained.

Attached at 37 to the top wall 12 is a further cylindrical boss 38 having the bearings 39, and journalled in the bearings 39 is a further shaft 40 to which is attached the collar 41, the shaft terminating in the threaded portion 42 which threadably engages at 43 with the hub portion 44 of a pair of further disc members 45, these disc members having the expanded annular portions at 46, the portions 44, 45 and 46 being made of magnetic material, such as iron, and with the members 38, shaft 40 and portion 42 being made of non-magnetic material, it being understood herein that all of the portions of the device which do not provide the necessary magnetic circuit should be constructed of non-magnetic material in order to concentrate the magnetic effect and lines of force to the area where required.

Received within the cavities 47 are the snugly fitted non-magnetic brass rings 48 to provide a lengthened magnetic circuit and to prevent short-circuiting of said circuit between the magnetic disc faces. It should be noted that the faces 49 are spaced a slight distance from the disc 33.

Wound about the hub portion or core 44 are the turns 50 which are made of suitably insulated wire, the leads of which turns pass through an opening 51 to the pair of conducting rings 52 which are attached to the insulated ring 53 which is secured to the shaft 40, and engaging the rings 52 are a pair of brushes 54 which are attached to an insulating block 55 which is attached to the bracket 56 which bracket 56 is attached to the boss 38 as shown.

Figure 4:
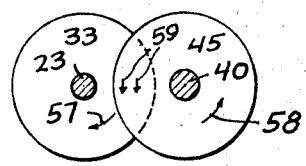
Figure 4 is a schematic view of the discs.

The device operates in the following manner. The shaft 23, which is the driven shaft, rotates the disc 33. As shown in Figure 4, the disc 33 is rotating in the direction of the arrow 57, with certain portions of the disc being positioned between the portions 46 of the discs 45. The coils 50 are suitably energized by any outside electrical source, which in turn causes the discs 45 to become magnetized, and also provides a complete magnetic path through the hub portion 44, the discs 45 and thence across between the portions 46, which, in effect, causes the magnetized particles in the magnetic fluid 15 to exert a strong binding magnetic effect, so that as the disc 33 rotates, the leverages applied against the annular portions of the disc 45 will cause the discs 45 to rotate in the direction of the arrow 58 as shown in Figure 4, thereby setting up a torque in the shaft 40 to drive the driven member. The magnetic drag or effort is applied in a series of tangential forces, these forces being exerted substantially in the direction of the arrows 59 as shown in Figure 4.

The power applied from the shaft 23 to the shaft 40 will be constant regardless of the relative positions of the discs 33 and 45, however, the speed ratio will change as will be evident from the following. In the position shown in Figure 1, the speed imparted to the shaft 40 will be at a minimum due to the fact that shorter lever arms are applied between the shaft 23 and the faces 49, thereby delivering the same power but a smaller speed to the shaft 40.

However, by pulling on the bar 27 in the direction of the arrow 60, the lever arms will be increased and therefore the speed of the shaft 40 will be increased. As a result, a smooth application of constant power with varying speeds can be supplied by means of my arrangement by moving the rod 27 inwardly or outwardly.

It should be noted that although the arrangement shown accommodates vertically positioned shafts, horizontally positioned shafts could also be employed utilizing the same principle herein and also with the driven shaft being positioned at the other side of the casing than the driving shaft, various other modifications also being apparent.

Figures 6 to 10 inclusive illustrate a modification of the present device, wherein excessive heat losses can be eliminated. In this structure, the casing 10, etc. is used, with the same shafts and driving disc, however, a pair of non-magnetic rings 61 which are spaced apart as shown in Figure 7 are employed, which rings can be secured to the inner non-magnetic discs 62 which are suitably attached to the shaft 40, and attached to the rings 61 are the several equally spaced U-shaped electro-magnets 63, which are energized by means of the coils 64. The electro-magnets 63 are suitably attached to the rings 61 by means of the screws 65.

Figure 5:
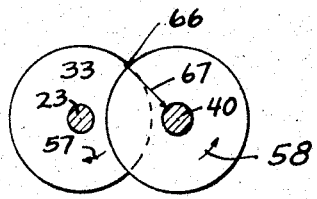
Figure 5 is a further schematic view of the discs.

As shown in Figure 6, twelve of these electro-magnets are used on each disc, or twenty-four in all, however, any number can be employed as long as they utilize the principles about to be explained. In the structure shown in Figures 1 and 2, assuming that a force, due to the magnetic attraction, were to be applied from the peripheral point 66, it will be noted that the vector or force will be exerted substantially in the direction of the arrow 67 (see Figures 5 and 6), which force will be directed practically directly against the center line of the shaft 40. Since this force will be exerted against a fixed rigid point, it will be unable to move the disc, thereby causing a certain amount of undesirable heat to be generated in the mechanism. To eliminate this objectionable feature, I provide the modification of spaced electro-magnets explained above, and I also energize the three electro-magnets when they occupy the position shown by the character 63', and these magnets being energized only at this point of revolution, so that the resultant forces will then be centralized closer to the radial line between the shaft centers 23 and 40, whereby the forces are not exerted in the direction of the vector 67 but more in a tangential manner with respect to the opposed disc faces.

Figures 8, 9 and 10 illustrate how the electro-magnets at the point 63' will become energized, the character 68 indicating an insulating ring in which the commutator segments 69 are attached, the commutator segments being attached to the various leads as shown by the wiring diagram, Figure 10, and with the electro-magnetic coil 64 being connected in series by means of the leads 70, it being understood, however, that the leads 70 will necessarily pass toward the shaft 40 and back again instead of as shown in Figure 10, due to the separated construction of the rings 61, the wiring being made in any desired manner, which wiring can also pass through the opening 71 to the commutator bars, etc., one side of the circuit which can be grounded as shown in Figure 10. A brush-holder 72 can be used, which is attached to any stationary portion of the casing, to which brush-holder are attached the three brushes 73, thereby providing the circuit to the three electro-magnets at only the moments required as is clearly evident. In this latter arrangement, the variation in speed, etc. can be effected by moving the shaft 23 in a similar manner as that above described in the other form.

It will now be noted that I have provided a variable speed magnetic fluid clutch drive which has all of the advantages mentioned in the objects of my invention with other advantages being readily apparent, and it should also be realized that various slight modifications or changes could be made in the construction without, however, departing from the essential spirit and principles elucidated herein.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A variable speed magnetic fluid clutch drive comprising a driving shaft and a driven shaft, a magnetically permeable disc attached to said driving shaft, a magnetized disc-like member attached to said driven shaft, said disc and said disc-like member rotating in co-planar relationship whereby magnetization of said disc-like member will cause said disc to magnetically bind with said disc-like member when opposed faces of said disc and said disc-like member are opposite each other to thereby rotate said disc-like member, means for adjustably positioning said disc along a radial line of said disc-like member to thereby adjustably change the speed of rotation of said driven shaft, a casing receiving said disc and said disc-like member, a magnetic fluid contained in said casing, said disc and said disc-like member being immersed in said magnetic fluid.

2. A variable speed magnetic fluid clutch drive comprising a driving shaft and a driven shaft, a magnetically permeable disc attached to said driving shaft, a magnetized disc-like member attached to said driven shaft, said disc and said disc-like member rotating in co-planar relationship whereby magnetization of said disc-like member will cause said disc to magnetically bind with said disc-like member when opposed faces of said disc and said disc-like member are opposite each other to thereby rotate said disc-like member, means for adjustably positioning said disc along a radial line of said disc-like member to thereby adjustably change the speed of rotation of said driven shaft, a casing receiving said disc and said disc-like member, a magnetic fluid contained in said casing, said disc and said disc-like member being immersed in said magnetic fluid, said disc-like member having a magnetized annular portion, movement of said disc radially causing a magnetic binding attraction at variable distances from said driving shaft to thereby provide said change of speed of rotation.

3. A variable speed magnetic fluid clutch drive comprising a driving shaft and a driven shaft, a magnetically permeable disc attached to said driving shaft, a magnetized disc-like member attached to said driven shaft, said disc and said disc-like member rotating in co-planar relationship whereby magnetization of said disc-like member will cause said disc to magnetically bind with said disc-like member when opposed faces of said disc and said disc-like member are opposite each other to thereby rotate said disc-like member, means for adjustably positioning said disc along a radial line of said disc-like member to thereby adjustably change the speed of rotation of said driven shaft, a casing receiving said disc and said disc-like member, a magnetic fluid contained in said casing, said disc and said disc-like member being immersed in said magnetic fluid, said disc-like member having a magnetized annular portion, movement of said disc radially causing a magnetic binding attraction at variable distances from said driving shaft to thereby provide said change of speed of rotation, said disc-like member including a pair of spaced further discs having a common hub portion, said disc having portions thereof received between said further discs.

4. A variable speed magnetic fluid clutch drive comprising a driving shaft and a driven shaft, a magnetically permeable disc attached to said driving shaft, a magnetized disc-like member attached to said driven shaft, said disc and said disc-like member rotating in co-planar relationship whereby magnetization of said disc-like member will cause said disc to magnetically bind with said disc-like member when opposed faces of said disc and said disc-like member are opposite each other to thereby rotate said disc-like member, means for adjustably positioning said disc along a radial line of said disc-like member to thereby adjustably change the speed of rotation of said driven shaft, a casing receiving said disc and said disc-like member, a magnetic fluid contained in said casing, said disc and said disc-like member being immersed in said magnetic fluid, said disc-like member having a magnetized annular portion, movement of said disc radially causing a magnetic binding attraction at variable distances from said driving shaft to thereby provide said change of speed of rotation, said disc-like member including a pair of spaced further discs having a common hub portion, said disc having portions thereof received between said further discs, means for causing said disc-like member to become electrically magnetized including a coil receiving said hub portion, means for passing an electric current through said coil.

5. A variable speed magnetic fluid clutch drive comprising a driving shaft and a driven shaft, a magnetically permeable disc attached to said driving shaft, a magnetized disc-like member attached to said driven shaft, said disc and said disc-like member rotating in co-planar relationship whereby magnetization of said disc-like member will cause said disc to magnetically bind with said disc-like member when opposed faces of said disc and said disc-like member are opposite each other to thereby rotate said disc-like member, means for adjustably positioning said disc along a radial line of said disc-like member to thereby adjustably change the speed of rotation of said driven shaft, a casing receiving said disc and said disc-like member, a magnetic fluid contained in said casing, said disc and said disc-like member being immersed in said magnetic fluid, said disc-like member having a magnetized annular portion, movement of said disc radially causing a magnetic binding attraction at variable distances from said driving shaft to thereby provide said change of speed of rotation, said disc-like member including a pair of spaced further discs having a common hub portion, said disc having portions thereof received between said further discs, means for causing said disc-like member to become electrically magnetized including a coil receiving said hub portion, means for passing an electric current through said coil, said further discs having annular non-magnetic rings imbedded therein to prevent short-circuiting of the magnetic circuits passing through said hub portion, said further discs and said disc.

6. A variable speed magnetic fluid clutch drive comprising a driving shaft and a driven shaft, a magnetically permeable disc attached to said driving shaft, a magnetized disc-like member attached to said driven shaft, said disc and said disc-like member rotating in co-planar relationship whereby magnetization of said disc-like member will cause said disc to magnetically bind with said disc-like member when opposed faces of said disc and said disc-like member are opposite each other to thereby rotate said disc-like member, means for adjustably positioning said disc along a radial line of said disc-like member to thereby adjustably change the speed of rotation of said driven shaft, a casing receiving said disc and said disc-like member, a magnetic fluid contained in said casing, said disc and said disc-like member being immersed in said magnetic fluid, said disc-like member having a magnetized annular portion, movement of said disc radially causing a magnetic binding attraction at variable distances from said driving shaft to thereby provide said change of speed of rotation, said disc-like member including a pair of spaced further discs having a common hub portion, said disc having portions thereof received between said further discs, means for causing said disc-like member to become electrically magnetized including a coil receiving said hub portion, means for passing an electric current through said coil, said further discs having annular non-magnetic rings imbedded therein to prevent short-circuiting of the magnetic circuits passing through said hub portion, said further discs and said disc, a journalling member for journalling said driving shaft, said journalling member being slidably engaged with said casing, a control unit attached to said journalling member for adjustably positioning said journalling member.

7. A variable speed magnetic fluid clutch drive comprising a driving shaft and a driven shaft, a magnetically permeable disc attached to said driving shaft, a magnetized disc-like member attached to said driven shaft, said disc and said disc-like member rotating in coplanar relationship whereby magnetization of said disc-like member will cause said disc to magnetically bind with said disc-like member when opposed faces of said disc and said disc-like member are opposite each other to thereby rotate said disc-like member, means for adjustably positioning said disc along a radial line of said disc-like member to thereby adjustably change the speed of rotation of said driven shaft, a casing receiving said disc and said disc-like member, a magnetic fluid contained in said casing, said disc and said disc-like member being immersed in said magnetic fluid, said disc-like member including a plurality of equally spaced electro-magnets spaced about its periphery, means for energizing a few only of said electro-magnets incidental upon positioning of said electro-magnets when opposite certain restricted areas of said disc.

GORMAN R. NELSON.

References Cited in the file of this patent

UNITED STATES PATENTS

| Number | Name | Date |
|---|---|---|
| 982,789 | Bowie | Jan. 31, 1911 |
| 1,181,381 | Guthrie | May 2, 1916 |
| 1,840,726 | Lange | Jan. 12, 1932 |
| 2,015,196 | Searing | Sept. 24, 1935 |
| 2,510,675 | Baruch | June 6, 1950 |
| 2,548,373 | Hurvitz | Apr. 10, 1951 |